United States Patent

[11] 3,624,615

[72] Inventors William A. Lippold
Worcester Park, England;
Robert W. Gould, Southboro, Mass.
[21] Appl. No. 877,905
[22] Filed Nov. 19, 1969
[45] Patented Nov. 30, 1971
[73] Assignee Honeywell Inc.
Minneapolis, Minn.

[54] TRANSACTION-RECORDING DEVICE
13 Claims, 9 Drawing Figs.

[52] U.S. Cl. .......... 340/172.5
[51] Int. Cl. .......... G06f 3/04
[50] Field of Search .......... 340/172.5, 149; 101/269; 179/2

[56] References Cited

UNITED STATES PATENTS

| | | | |
|---|---|---|---|
| 3,436,736 | 4/1969 | Platt et al. | 340/172.5 |
| 3,184,714 | 5/1965 | Brown et al. | 340/149 |
| 3,308,439 | 3/1967 | Tink et al. | 340/172.5 |
| 3,335,407 | 8/1967 | Lange et al. | 340/172.5 |
| 3,351,919 | 11/1967 | Milford | 340/172.5 |
| 3,402,662 | 9/1968 | Blair et al. | 101/269 X |
| 3,428,959 | 2/1969 | Acker | 340/172.5 |
| 3,447,457 | 6/1969 | Dechert et al. | 101/269 |
| 3,465,672 | 9/1969 | Whitfield | 101/269 |
| 3,515,806 | 6/1970 | Spraker | 179/2 |
| 3,516,068 | 6/1970 | Howard et al. | 340/172.5 |

*Primary Examiner*—Raulfe B. Zache
*Assistant Examiner*—R. F. Chapuran
*Attorneys*—Fred Jacob and Leo Stanger

ABSTRACT: In a transaction recorder, a printer imprints legible information embossed on plastic identification cards and information entered manually with variable types, onto a set of papers. An electrical circuit responds to machine readable embossings on the cards and to the manual entries to furnish audiofrequency signals corresponding to the information printed. A recorder records these signals on magnetic tape. Batches of such recorded signals are played back at convenient intervals, through a telephone handset acoustically coupled to the recorder, to a central processing station.

INVENTORS
WILLIAM A. LIPPOLD
ROBERT W. GOULD
BY Fred Jacob
ATTORNEY

INVENTORS
WILLIAM A. LIPPOLD
ROBERT W. GOULD
BY
Fred Jacob
ATTORNEY

INVENTORS
WILLIAM A. LIPPOLD
ROBERT W. GOULD
BY Fred Jacob
ATTORNEY

INVENTORS
WILLIAM A. LIPPOLD
ROBERT W. GOULD
BY
Fred Jacob
ATTORNEY

TRANSACTION-RECORDING DEVICE

BACKGROUND OF THE INVENTION

This invention relates to methods and means for making records of transactions, particularly business transactions that require a legible readout. The invention is more specifically directed to methods and means for making records of business transactions that involve the use of cards, such as credit cards, to identify one or more of the parties to the transaction in legible, that is, human readable, type and that require a legible readout.

Such transactions may for example involve a credit card customer at a retail establishment. The customer's plastic credit card identifies the customer with embossings in the shape of his name and account numbers. After servicing the customer, the retail clerk mechanically enters the information on the customer's card into the recorder by placing the card into the recorder adjacent a fixed plastic card with embossings that identify the retail establishment. The attendant then manually enters the details of transactions, such as the stock number of the item sold, the department number, and the price into the recorder by means of manually adjustable entry levers. These levers move corresponding-type characters in the recorder to locations adjacent the embossings. A printing device presses the exposed embossings and type characters against a set of overlying paper sheets with interleaved inking devices, such as carbon slips, to produce several copies of the transaction. The customer receives one copy. Other copies are mailed or carried to a central data station which performs necessary billing and statistical services.

Such devices may also be used for transactions which involve recording of transactions in a hospital or warehouse. Thus accounting and inventory control may be maintained at a central location. The control may involve the use of computers.

Such a system of transaction recording and information processing is necessarily slow and tedious. It involves translating the humanly legible paper copies, the so-called hard copies, into computer language before analysis can be made by a computer. On the other hand, linking such transaction recorders directly to a computer is wasteful. It involves complicated equipment at the recorder locations. It unnecessarily utilizes the equipment at the central processing location during the busiest hours. Also the local transaction recorder requires equipment compatible with the computer.

SUMMARY OF THE INVENTION

The invention obviates these deficiencies. According to a feature of the invention, both machine readable information and corresponding humanly legible information are entered into the recorder, preferably by means of a credit card, and sensing means that respond to the machine readable information generate correspondingly coded audiofrequency tones that can be transmitted to a computer over voice grade telephone equipment. Preferably the humanly legible information appears as embossings, and writing means print from the embossings onto paper. Preferably the sensing means sense the machine readable information in response to at least a portion of the printing process.

According to another feature of the invention the machine readable information is entered as embossings on a document. According to another feature the machine readable information is in part entered manually by setting movable switches that move with movable types.

According to another feature of the invention, the generated audiofrequency tones are stored on a storage medium, such as magnetic tape. Preferably a magnetic recording machine located at the recorder location records the information on the storage medium.

According to still another feature of this invention, coupling means acoustically couple the thus recorded tones into the handset of a telephone for transmission over voice-grade telephone equipment to a central processing unit where these tones can be converted into signals suitable for computer operation.

According to yet another feature of the invention, several transactions are sequentially recorded on the magnetic tape in the form of audiofrequency tones. The resulting tones are transmitted through the acoustical coupler and the telephone in batches that include many transactions, preferably during times in which the computer is in a slack condition.

According to still another feature of the invention, the machine readable information on the cards is in the form of binary spot-shaped embossings whose locations indicate the information, and the cards are pressed against a pressure-sensitive sensor so the spots enable the sensor to emit electrical signals corresponding to the spot locations.

According to still another feature of the invention, the recorder forms part of a system which includes other recorders, connected by voice lines to the central computer.

According to still another feature of the invention, the sensor includes a so-called cross wire matrix, that is a group of parallel wires in one plane separated from a group of parallel wires in a second plane and extending transverse to the first group. The binary spot embossings on the cards, when pressed against the wires at crossover locations cause the wires to contact each other electrically. A reader that sequentially excites the wires of one group, thus generates coded signals on the other group. Suitable oscillators responding to these coded signals generate audiofrequency signals.

According to still another feature of the invention, the audiofrequency recorder, the coding means, the audio signals means and the printing means are mounted in a single cabinet which may be smaller than two small desk drawers.

According to a preferred embodiment of the invention, this cabinet is hinged to expose a cradle for a telephone handset so that when the recorder is played back the handset can be placed in the cradle.

By virtue of these features, a small inexpensive transaction recorder may furnish both hard copy (i.e., printed copies) and data immediately transmittable to a computer, and allow for such transmission in batches during times when the central computer is most available. Moreover, by virtue of recording the information on the tape as well as receiving the hard copy, it is possible to recheck for errors that may have occurred at any stage of the recording process.

These and other features of the invention are pointed out in the claims. Other advantages and objects of the invention will become obvious from the following detailed description when read in light of the accompanying drawings.

DESCRIPTION OF PREFERRED EMBODIMENT

Figure 1:
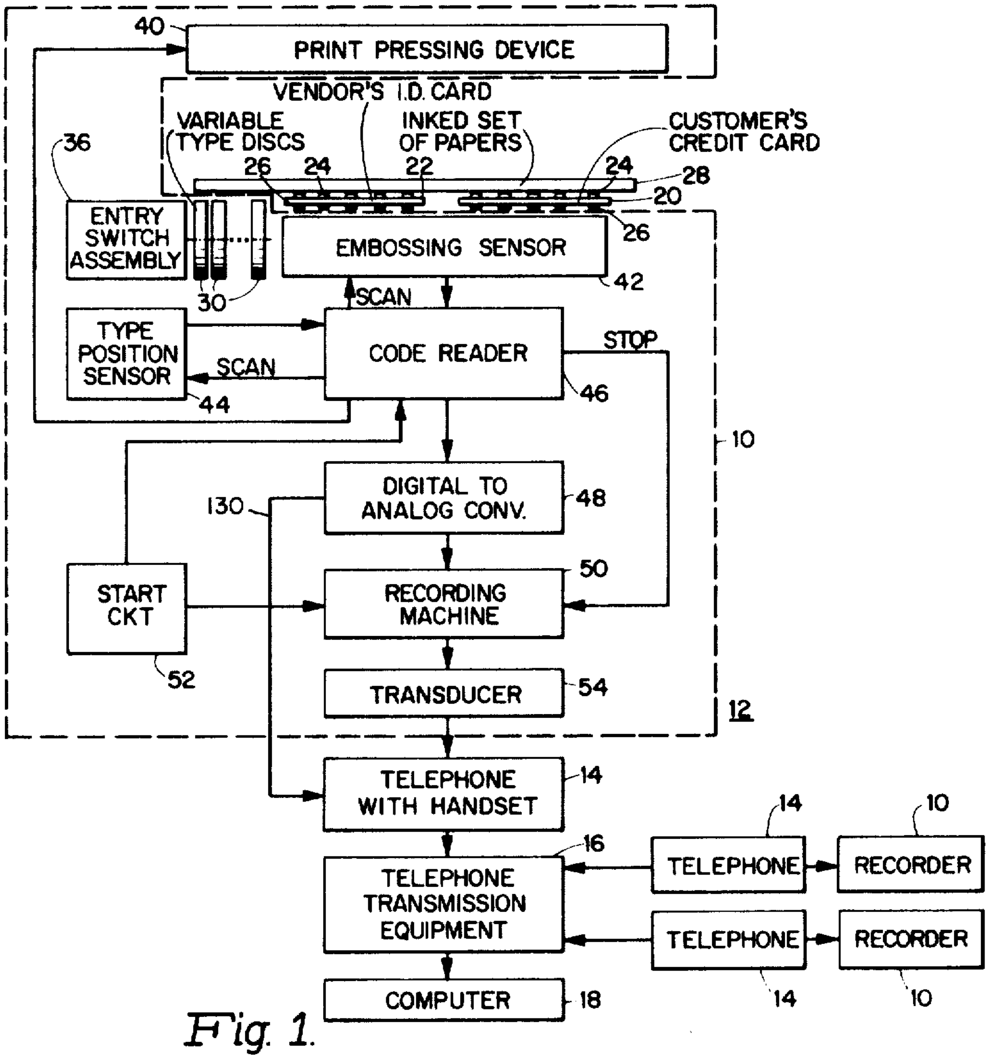
FIG. 1 is a block diagram illustrating a recorder and a recording system embodying features of the invention.

In FIG. 1, a local transaction recorder 10, embodying features of the invention and illustrated in the form of a block diagram, forms part of an overall transaction recording system 12. The latter includes a voice telephone 14 with a handset, voice grade telephone transmission equipment 16, and a central computer 18. The system 12 forms part of a still larger system composed of other telephones 14 and recorders 10 which the equipment 16 connects to the computer 18. The telephone equipment includes voice lines.

Each transaction recorder 10 is located in a business or other establishment for the purpose of making both humanly legible and machine readable records and transmitting the information to the central computer 18. The recorder 10 is the local terminal of the system 12 and is located in a retail store for making records of credit sales. However, it and the other recorders 10 may also be located in other establishments such as hospitals or warehouses for making records of patients' treatments or stock additions and removals. The establishments are all remote from the central computer 18.

Figure 2:
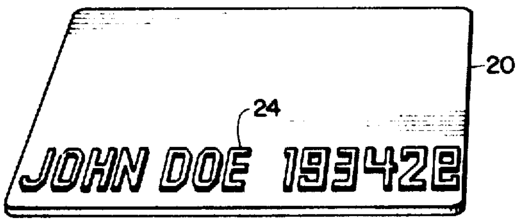
FIGS. 2 and 3 are perspective front and rear views of a credit card used with the recorder of FIG. 1.
Figure 3:
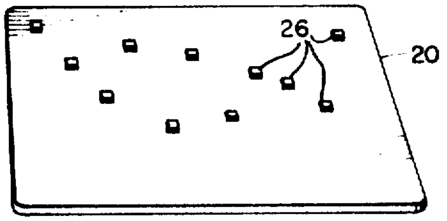

The recorder 10 accepts two embossed plastic cards 20 and 22. The card 20 is the customer's credit card. On the front of the card 20 embossings in the shape of alphabetic and numeric characters 24 protrude to identify the customer. This is shown in more detail in FIG. 2 which illustrates the front of card 20. The rear of card 20 appears in FIG. 3. Here spot embossings, protrusions, or reverse dimples 26 are arranged in locations to represent decimal indicia of the information stored on the front of the card. The vendor's identifying card 22 is preferably fixed in place with screws in a recess of the recorder 10.

In FIG. 1 when a customer makes a purchase, the card 20 is placed face up in a recess of the recorder 10 near the card 22. A set of papers 28 interleaved with pressure sensitive inking means such as carbon paper are placed over the card 20 and 22. The set of papers 28 also extends over the edges of a set of type disks 30 having embossed alphabetical or numeric type projecting from their edges. A variable entry switch assembly 36, which is controlled manually by the operator of the recorder, selectively rotates the disks about a common axis to positions in which one character on each disk is exposed to the papers 28. The operator rotates the disks so as to expose those characters which correspond to the information of the transaction. This information may, for example, contain the date of the transaction, the price and the identifying numbers of the items sold.

To make a record, the operator passes a print pressing device 40, such as shown in U.S. Pat. No. 2,582,187 to W. H. Wolowitz, against the set of papers 28 so as to press them against the exposed type on disks 30 and the embossings 24. This imprints the embossings on the papers 28 so as to make enough copies of the transaction to furnish one for the customer, one for the vendor and one for central billing. Additional spare copies may also be made.

The print pressing device 40 also presses the machine-readable embossings 26 against a binary embossing sensor 42. This sensor may, for example, constitute a cross wire matrix. A type position sensor 44 which responds to the entry switch assembly 36 senses which character in each disk 30 is exposed to the papers 28. A code reader 46 scans the sensor 42 to generate signals corresponding to the numeric information of the embossings 26 and hence the information on the credit cards. It also scans the sensor 44 so as to produce signals corresponding to information in the variable-type disks 30. The code reader 46 transmits this information to a digital-to-analog converter 48, such as shown in U.S. Pat. No. 3,184,554 to L. A. Meacham et al., with a number of oscillators that generate sequential audiofrequency signals suitable for voice grade transmission on a telephone line and corresponding to the information on the credit cards 20 and 22 and on the variable-type disks 30.

A cassette-type tape recording machine 50 such as the Telex-phonola, Cassette Tape Recorder, Model 9000, manufactured by Nippon Electric Co., Ltd., records these audiofrequency signals and stores them for batch transmission. A start circuit 52 starts operation of the tape machine 50 and reader 46. However, it delays scanning by the code reader 46 so as to allow the recorder 50 to reach recording speed. After the delay the start circuit 52 generates a start signal in the recording machine 50. The code reader 46 responds to the last signal by causing the converter 48 to record a stop signal in the machine 50. The code reader also turns the machine 50 off. The start circuit 52 is manually operated by the attendant.

After the recording machine 50 has recorded a number of transactions, for example, a day's transactions in the retail store, the attendant dials the telephone 14 to make the telephone equipment 16 connect the telephone to a central computer 18. He then places the handset of telephone 14 into a transducer 54 in the form of a cradle. He then plays back the voice grade recordings in the recording machine 50 through the telephone handset.

Figure 5:
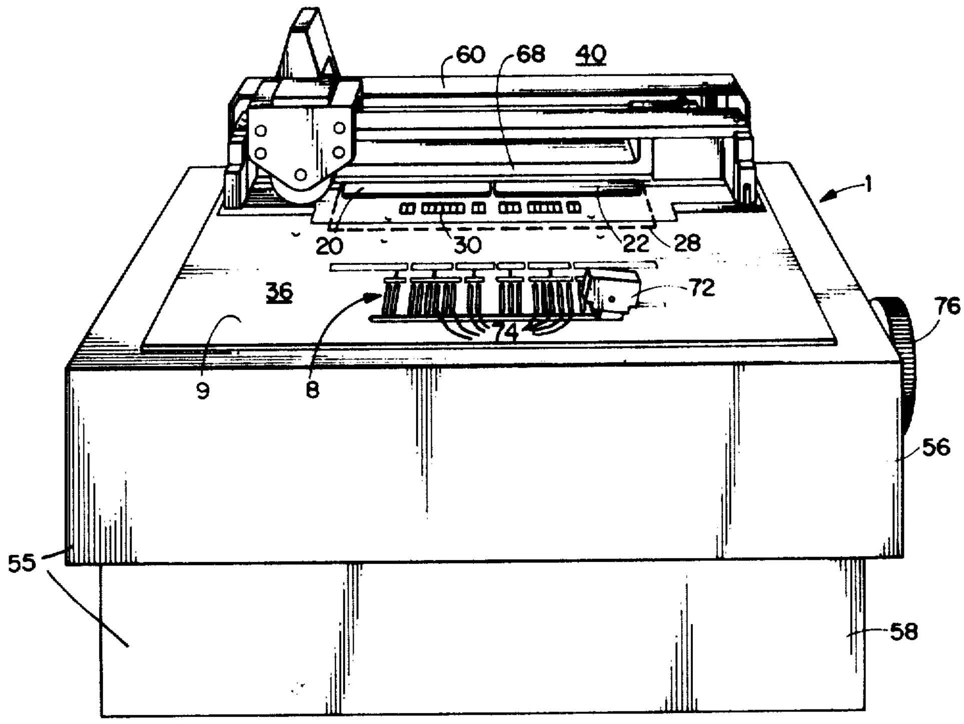
FIG. 5 is a perspective view of the recorder illustrated in FIG. 1 with the print pressing device in its operating position.
Figure 4:
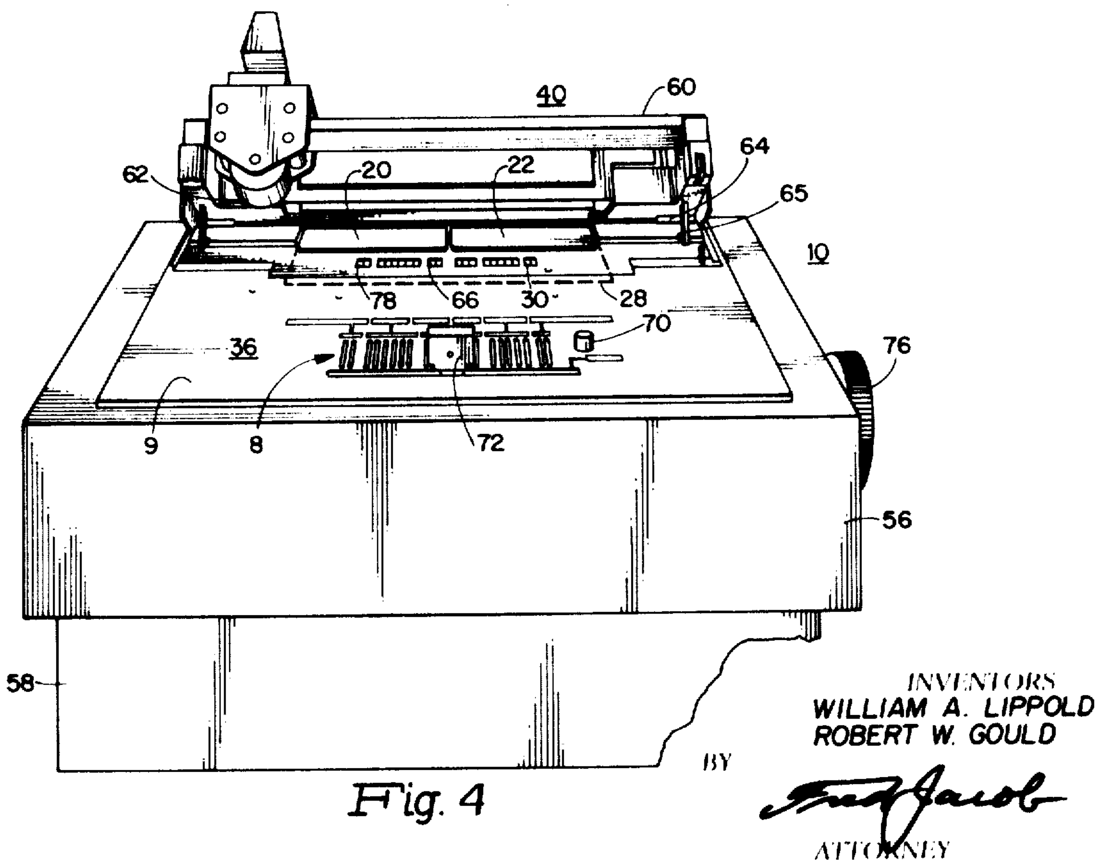
FIG. 4 is a perspective view of the transaction recorder in FIG. 1 illustrating the print pressing device in its idle position.
Figure 6:
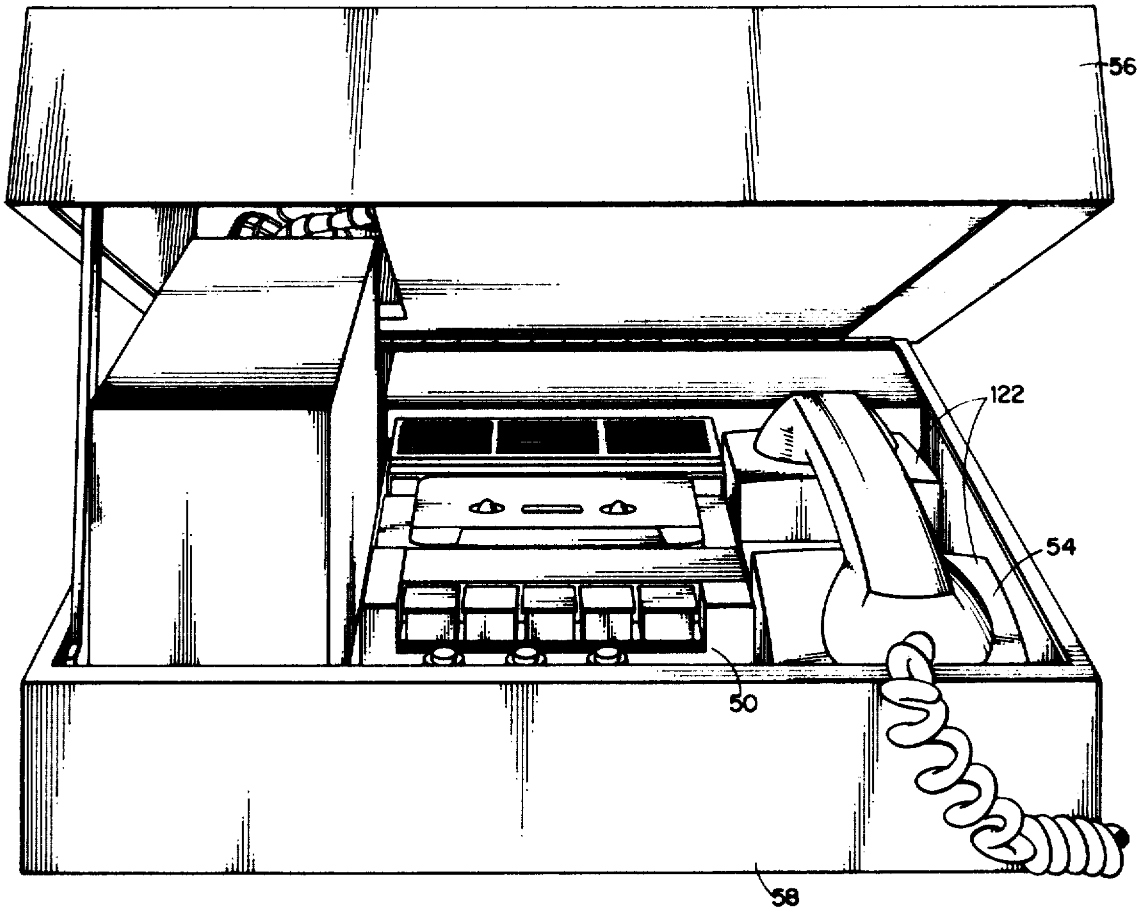
FIG. 6 is a perspective drawing showing the interior of the recorder in FIG. 4 wherein a portion of the recorder console has been raised to gain access to the acoustic coupler by virtue of which signals are coupled into a telephone handset.

According to one embodiment of the invention, the transaction recorder 10 has the construction shown in FIGS. 4, 5 and 6. Here a console 55 composed of portions 56 and 58 which are hinged to each other in the back to open to the position shown in FIG. 6 enclose the embossing sensor 42, the type position sensor 44, the code reader 46, the digital-to-analog converter 48, and the recording machine 50, the start circuit 52 and the transducer 54. The pressing device 40 comprises a rail assembly 60 that carries a print roller 62 which travels across the rail. The rail assembly 60 articulates about a pair of hinges 64 to move from the open idle position or raised position shown in FIG. 4 to the closed operating position shown in FIG. 5. A bolt 65 holds the assembly 60 in a closed position. In the raised position the credit cards 20 and 22 are placed in suitable recesses and covered with the set of papers 28. The set of papers are shown in phantom line to illustrate the credit cards as well as the portions of the disk 30 which protrude through windows 66 in the face of the console portion 56 for printing the embossings on the disk faces.

The print pressing device 40 also includes a plate 68. When the rail assembly 60 is lowered and locked into its closed position as shown in FIG. 5, the plate 68 presses the cards 20 and 22 downwardly so that the embossings 26 close the cross wire switches in the embossing sensor 42. However, the plate 68 exposes portions of the credit card 20 and 22 having the legible writing so that the print roller 62 can slide across the rail assembly 60 and press the papers 28 against the embossings 24 on the tops of the card and against the embossings at the edge of the type disks 30. A push button 70 manually starts the start circuit 52 after the rail assembly is in the lowered position shown in FIG. 5 and after the variable entry switch assembly 36 has been operated.

In FIGS. 4 and 5 the variable entry switch assembly 36 is composed of a lever 72 which is moved from one of the positions 74 to another. In each position a hand wheel 76 is turned. Turning of the wheel 76 rotates the type disks corresponding to the position at which the lever 72 is located. When the desired number corresponding to that position at the edge of the type disk being turned projects through the window 66 in the face of the console portion 56, the attendant may then move the levers to the next position and manipulate the hand wheel 76 to obtain the correct numbers in the following position.

Figure 7:
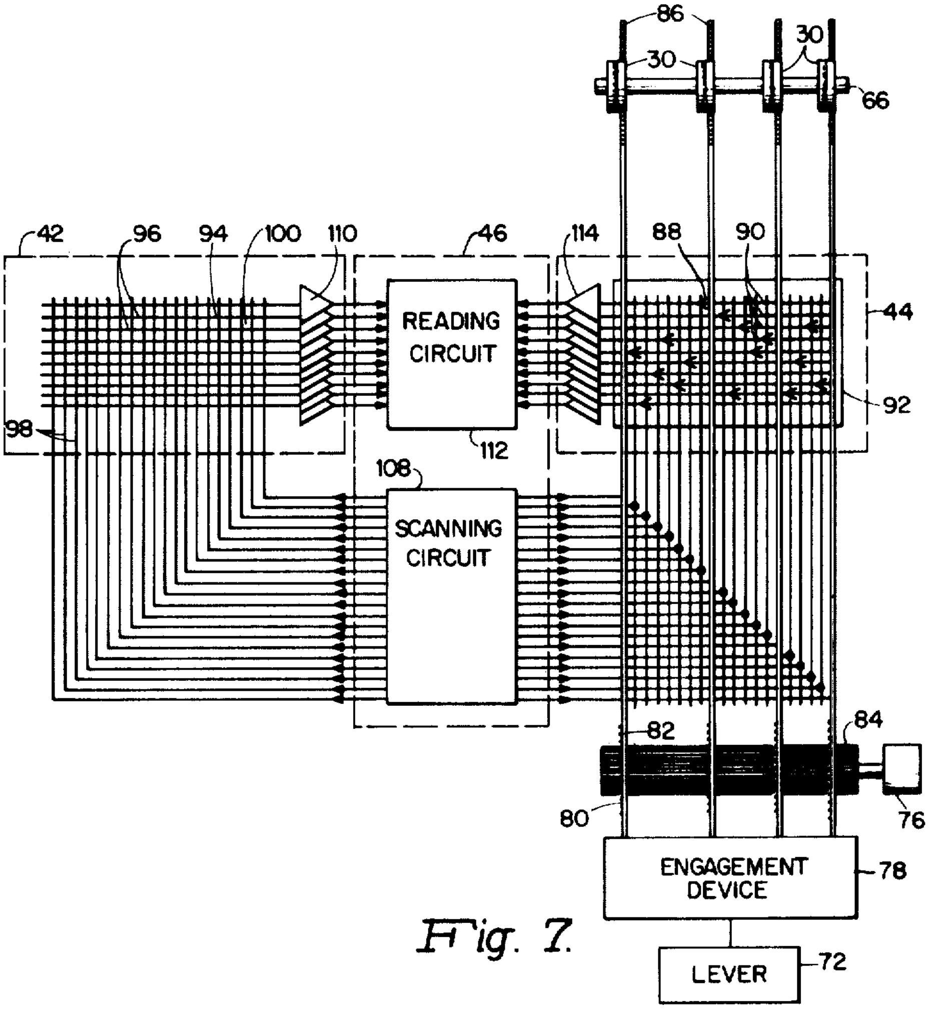
FIG. 7 is a partially schematic block diagram illustrating in more detail an entry switch assembly, type position sensor, embossing sensor, and code reader of FIG. 1.

The operation of the entry switch assembly 36 is shown in more detail in FIG. 7. Here when the lever 72 is placed in any one of the positions 74 shown in FIGS. 4 and 5, an engagement device 78 engages the teeth 80 of a rack 82, of which only four of the actual 20 are shown for clarity, corresponding to that position, to an elongated gear 84 operated by the hand wheel 76. The engaged rack 82 moves longitudinally as the hand wheel 76 is turned. This causes teeth 86 on the same rack to move teeth on the rim of the corresponding one of the type disks 30, of which only four of the actual 20 are shown for clarity, so that the latter turns until the desired numeral appears in the window 66 of the console portion 56. The lever is then moved to the adjacent position to move adjacent racks with the hand wheel 76 and the gear 84. The movement of the racks 82 causes a leaf spring contact 88 mounted on each rack to contact one of 10 parallel conductors 90 on a conductor board 92. The conductor which is contacted at any point corresponds to the number appearing in the window 66.

The cross wire matrix forming part of the embossing sensor 42 is also shown schematically in FIG. 7, and designated 94. The matrix is composed of 10 separate wires 96 held taut in one horizontal plane extending in one direction and 20 separate wires 98 held taut in a second horizontal plane parallel to the first plane and extending in a direction transverse to the 10 wires 96. Thin polyethylene sheet forming a spacer separates the two planes of wires. A hole exists in the spacer at each crossover point of the transverse wires. For each of up to 20 numerals or digits on the cards there is a single embossing in one of the 10 positions corresponding to one of the set of 10 wires. Each of the 20 wires corresponds to a numeral or digit position in one of two cards. The cards 20 and 22 are placed in a recess which aligns the embossings 26 with crossover points in the matrix 94. The embossings when pressed against the cross wire matrix therefore press one of the wires 96 in one set against one of the wires 98 in the other set for each numeral position.

Figure 8:
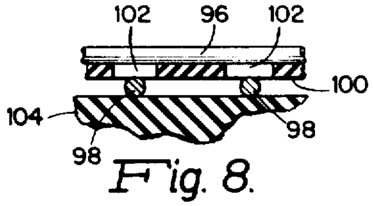
FIG. 8 is a cross section of a portion of the sensor in FIG. 1.
Figure 9:
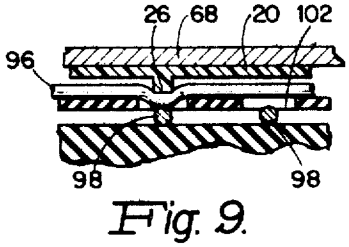
FIG. 9 is a cross section of the portion in FIG. 7 as it senses a portion of a card in FIG. 1.

FIG. 8 illustrates two crossover points of the matrix 94. Here one of the wires 96 held taut at its ends lies on the face of the before-mentioned polyethylene spacer here designated 100. The spacer 100 defines holes 102 at the crossover points of the wire 96 with two wires 98 held taut in the transverse direction, in and out of the paper in FIG. 8. An insulating surface 104 supports the wires 98. When an embossing 26 on the credit card 20 is forced against the wire by the plate 68 as shown in FIG. 9 the wires 96 and 98, as well as the intervening polyethylene spacer 100 are distorted to create a contact between the wire 96 and the left of the wires 98. The wires 98 correspond to a numeric position on the cards 20 and 22 while the wires 96 extending horizontally in FIG. 7 correspond to a numeric value on the embossings of the cards 20 and 22. These wires remain in contact so long as the plate 68 presses the card against the cross wire switches.

A scanning circuit 108 in the code reader 46 excites the wires 98 in one by one so that successive voltages appear on the wires 98. At each moment the voltage at the excited one of the wires 98 appears at the one of the wires 96 which the embossing 26 presses. Amplifiers 110 in the sensor 42 transmit these voltage signals to a reading circuit 112 in the code reader 46. After the last wire 98 has been scanned, the scanning circuit 108 continues scanning the contacts 88 in the type position sensor 44. Successive output signals then appear at 10 amplifiers 114 which are also transmitted to the reading circuit 112 of the code reader 46.

The converter 48 responds to the code reader 46 by producing selected pairs of single frequency tones for each signal at one of the amplifiers 110 and 114. Each pair of tones corresponds to one numeral. These signals emanating from the converter 48 then correspond to the successive signals scanned by the scanning circuit 108 and represent the numerical signals in order of the successive numerical values on the card and the successive numerical values entered by means of the entry switches.

The recording machine 50 utilizes cassettes. It is in the record mode as shown in FIG. 6. It is started by the start circuit 52 which in turn receives energization by the button 70. When the machine 50 reaches the desired speed level the start circuit 52 also starts the scanning circuit 108 in the code reader 46. When the operator lifts the console portion 56 to expose the machine 50, he can change it from its record to playback mode. The speaker device of the recorder appears as the transducer 54 which is in the shape of a cradle 122 that receives the handset of the telephone 14. When the telephone has been connected by suitable dialing, the clerk may place the machine 50 into the playback mode and play all the recorded information through the telephone 14 and telephone equipment 16 to the computer 18.

An attendant in a retail store wishing to record credit card sales starts by securing the establishment's identifying card 22 in the suitable recess. He then, by manually moving the lever 72 and the hand wheel 76, enters such data as the date into the entry switches so they appear at the window 78. For each transaction he places the customer's card 20 into position, places a set of papers 28, which are assembled in advance and are sold as a group secured to each other, in the position shown in FIGS. 4 and 5. He then moves the lever 72 to the position corresponding to the item being sold. This engages the teeth 80 of the appropriate rack 82 with the gear 84. He then turns the hand wheel 76 until the rack 82 turns the type disks 30 so that the appropriate numerals appear in the window 78. This stations the leaf spring contacts 88 on the appropriate conductors 90 of the board 92 on the type position sensor 44. He then places the set of papers 28 into the position shown in FIG. 4, lowers the rail assembly 60 to the position shown in FIG. 5 thereby pressing the plate 68 against the cards 20 and 22. This causes the embossings on the cards which represents and identifies both the buyer and seller to close wires corresponding to the numerals on the embossings and the identifying characteristics in the cross wire matrix 94. By sliding the print roller 62 over the legible portions of the cards 20 and 22 the embossings 24 imprint a legible readout in the set of papers 28 by means of the carbons that have been interleaved between the papers of the set. At this point the pressure of the plate 68 still remains.

The attendant then pushes the button 70 which causes the start circuit 52 to start the recorder 50. After the recorder 50 reaches a predetermined speed, the starting circuit 52 produces a start signal which is recorded on the recorder 50 and initiates scanning by the scanning circuit 108 of the code reader 46. The scanning circuit sequentially scans the wire 98 and leaf springs 88 to thereby produce suitable signals on the wires 96 and the conductors 90 in the reading circuit 112. When the last of the leaf springs 88 has been scanned, the scanning circuit 108 in the reader 46 initiates a stop signal which is recorded in the recording machine 50 through converter 48. After a short delay this stop signal stops the recording machine 50 and prepares it for the next transaction. It also actuates a solenoid which releases the bolt 65 that in turn releases the rail assembly 60 which has been locked into its downward position shown in FIG. 5. The assembly 60 returns to the position shown in FIG. 4. The attendant then returns the credit card 20 to the customer with one copy of the printed transaction. He retains a copy for his own files and a copy for central accounting. After thus recording a number of transactions, at the end of the day, the attendant lifts the console portion 56, dials a number to obtain a connection through equipment 16 to a central computer 18 and places the handset of telephone 14 into the cradle 122. He then places the recording machine 50 into the playback mode so that the day's transactions are immediately available to the central computer 18.

By virtue of the invention, transactions are transmitted to the computer 18 in batches rather than during the day's operation. It is thereby possible to obtain use of the computer during its least used time. It also allows the retail establishment to maintain tapes of what has actually been recorded and to again read it into the computer 18 so that an error caused by equipment 16 can be corrected. Moreover because of the retention of the "hard copy" in the form of legible writing, the output of the recording machine 50 can be compared to correct any mistakes occurring in the recorder 10 itself.

While information is normally recorded during the day according to the invention and transmitted through the telephone voice link during the end of the day, it is possible to transmit directly from the converter 48 to the telephone handset by means of a connection 130.

While an embodiment of the invention has been described in detail, it will be obvious to those skilled in the art that the invention may be otherwise embodied without departing from its spirit and scope. For example, the embossings 24 need not necessarily be on the side or face of the card opposite to the legible numerals. They may be on the same side with the cross wire switch contacting them on top of the console.

What is claimed is:

1. A device for recording transactions in conjunction with a document carrying information thereon which is legible to a human and also carrying corresponding machine detectable information comprising:

station means for receiving said document;

writing means at said station for responding to the humanly legible information on the document and transferring it to a humanly legible medium so as to form a humanly legible record;

sensing means at said station for sensing the machine detectable information and providing a plurality of sequential audiofrequency coded signals in response thereto; and information carrying means including recording means for storing the audiofrequency signals at the time they are generated and for regenerating the stored signals and further including coupling means for coupling the regenerated signals to a transmission device for transmission to a location remote from said station.

2. A device as in claim 1 wherein the document carries the information in the form of embossings and wherein the said writing means transfer the humanly legible information to the legible medium by pressing the legible medium against the embossings, wherein said writing means press said document against said sensing means, and wherein said sensing means include pressure-sensitive means for responding to the pressure of said writing means against the document to furnish electrical signals.

3. A device as in claim 1 wherein the document carries the humanly legible information in the form of projecting embossings and also carries the machine detectable information in the form of detectable embossings, said writing means including pressure application means for pressing the embossings of the document against the humanly legible medium, and said sensing means said sensing means including pressure sensitive means adjacent said embossings corresponding to the machine detectable information, for responding to the pressure of said pressing means to form a plurality of sequential coded signals.

4. A device as in claim 1 wherein said coupling means further comprises acoustical coupling means for coupling the regenerated output of said recording means to the handset of a telephone.

5. A device as in claim 1 further comprising transaction entry means including a plurality of movable types for entering humanly legible information onto the humanly legible medium upon said writing means transferring the humanly legible information on the document to the humanly legible medium, said transaction entry means having switch means, said sensing means being connected to said switch means to generate coded signals corresponding to the entries along with the coded signals corresponding to the information on the document.

6. A device as in claim 5 wherein the information on the document which is humanly legible and machine readable is comprised of embossings and wherein the plurality of selectively settable type wheels have a type face projecting near the document so as to print both the humanly legible information and the type faces upon the humanly legible document.

7. A device as in claim 3 wherein said sensing means include a first plurality of spaced conductors and a second plurality of spaced conductors extending transverse to the first plurality so as to form crossover points and spaced from said first plurality of conductors, wherein the writing means hold the document so that embossings corresponding to the machine readable information on the document press against conductors of said first plurality so they contact conductors of said second plurality at the crossover points of said conductors as determined by said embossings, and wherein electrical driving means sequentially energize conductors of one plurality of conductors and detecting means detect the energization at the conductors of the other plurality of conductors.

8. A device as in claim 7 wherein electrical generating means respond to said detecting means for generating predetermined audiofrequency signals on the basis of which conductors of the other plurality of conductors have been energized and the time during the sequential energizing of the conductors of the one plurality of said conductors.

9. A device for recording transactions comprising, a recording station for accepting a document carrying legibly embossed information and machine readable information, entry means for manually entering other embossed information to said station, writing means at said station for holding said document and printing legible copies of the embossed information, sensing means coupled to said station and responding to the action of said writing means so as to be subjected to modifications corresponding to the information, transform means connected to said sensing means for generating audiofrequency tones corresponding to the modifications, recording means coupled to said transform means for recording and playing back the audiofrequency tones, coupling means connected to said recording means for acoustically coupling the audiofrequency tones played back by said recording means to a telephone set.

10. A system comprising a plurality of recording stations each adapted for accepting a document carrying legibly embossed information and machine readable information;

each of said stations having;

entry means for manually entering other information to said station, writing means for holding said document and printing legible copies of the embossed information, sensing means connected to said station and responding to the action of said writing means for generating electrical signals corresponding to the information, transform means connected to said sensing means for generating audiofrequency tones corresponding to said electrical signals, recording means coupled to said transform means for recording and playing back the audiofrequency tones, coupling means connected to said recording means for acoustically coupling the audiofrequency signals played back by said recording means to a telephone set; a plurality of telephones each capable of being acoustically coupled to each of said coupling means, telephone equipment means for connecting each of said telephones, and a central computer connected to said equipment means for processing the acoustically coupled tones.

11. The machine method of recording transactions which comprises the steps of transferring the humanly legible information on a document which also carries the information in machine readable form onto a humanly legible medium, simultaneously energizing a machine reading device in response to the transference of the humanly legible information to generate a plurality of audiofrequency signals coded to correspond to the information on the document, recording the audiofrequency signals in a storage device, and later playing the signals back and coupling them acoustically to a telephone handset.

12. The method as in claim 9 wherein the humanly legible information appears on the document in the form of a plurality of legible embossings, wherein the step of transferring the information involves pressing these embossings against paper and inking means, and wherein the step sensing the machine readable information and generating the audiofrequency signals responds to the pressure of the pressing step.

13. The method as in claim 12 wherein the machine readable information is on the document in the form of embossings and the step of pressing initiates the step of sensing.

* * * * *